United States Patent [19]

MacDougall

[11] Patent Number: 4,467,392

[45] Date of Patent: Aug. 21, 1984

[54] CAPACITOR RESISTOR

[75] Inventor: Frederick W. MacDougall, Marion, Mass.

[73] Assignee: Aerovox Incorporated, New Bedford, Mass.

[21] Appl. No.: 412,572

[22] Filed: Aug. 30, 1982

[51] Int. Cl.³ .............................................. H01G 1/11
[52] U.S. Cl. .................................................. 361/275
[58] Field of Search .............. 361/275, 313, 314, 315, 361/323

[56] References Cited

U.S. PATENT DOCUMENTS 3,840,787  10/1974  Grahame ............................ 361/275
4,001,657  1/1977   Robinson ........................... 361/275

Primary Examiner—Donald A. Griffin

[57] ABSTRACT

Capacitor including a first and a second electrode strip separated by a dielectric strip, the electrode strips and the dielectric strip being wound in a roll, the dielectric strip having an opening therethrough, there being a discharge resistor strip mounted between the first electrode strip and the dielectric strip at the opening, one surface of the resistor strip having a portion in electrical contact with the second electrode strip through the opening, the opposite surface of the resistor strip having at least a portion in electrical contact with the first electrode strip.

8 Claims, 1 Drawing Figure

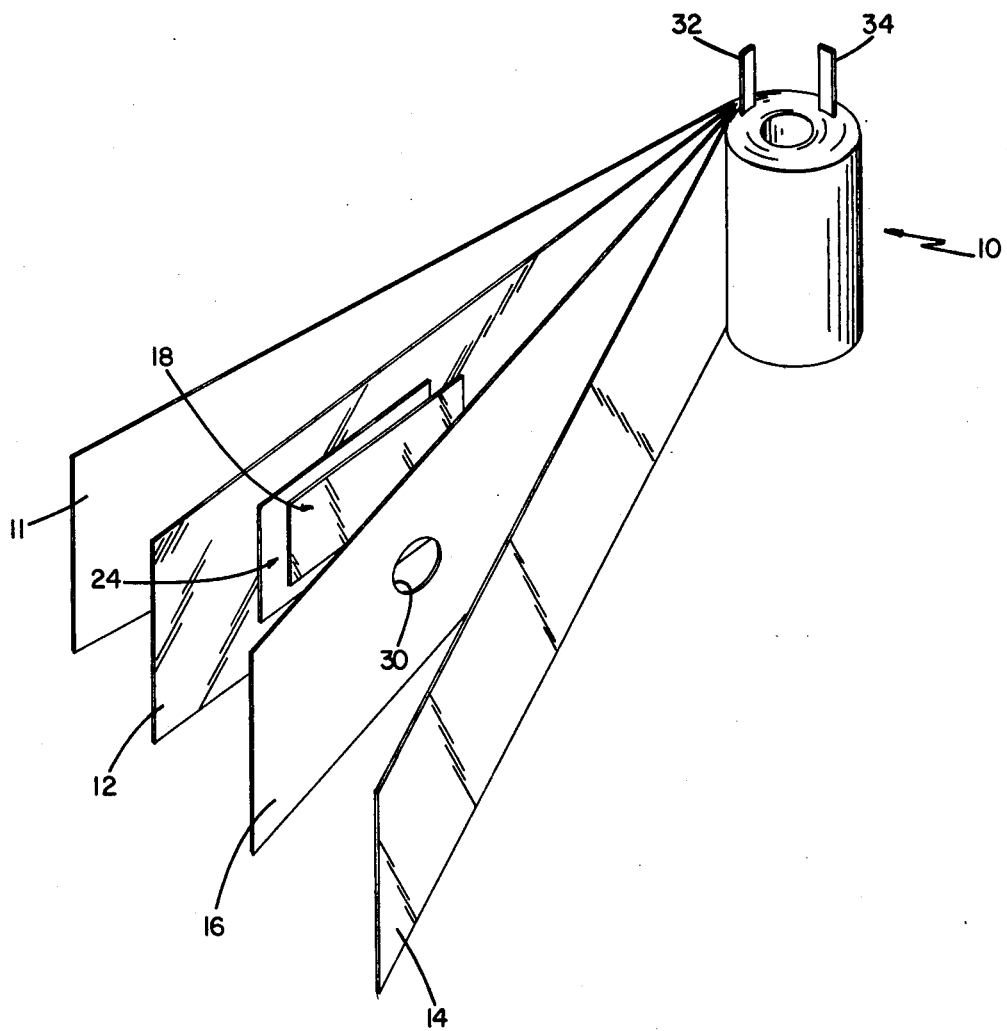

CAPACITOR RESISTOR

BACKGROUND OF THE INVENTION

This invention relates to internal discharge resistors for capacitors.

Discharge resistors are used in capacitors to discharge stored energy after the capacitor has been disconnected from a power source, to minimize the possibility of accidental electrical shock. The resistor is commonly provided in the form of a predetermined resistivity strip which connects capacitor electrodes. For example, Grahame U.S. Pat. No. 3,840,787 describes a resistor strip which connects two staggered foil electrodes separated by a dielectric strip having an exposed edge.

SUMMARY OF THE INVENTION

In general, the invention features a capacitor including a first and a second electrode strip separated by a dielectric strip, the electrode strips and the dielectric strip being wound in a roll, the dielectric strip having an opening therethrough, there being a discharge resistor strip mounted between the first electrode strip and the dielectric strip at the opening, one surface of the resistor strip having a portion in electrical contact with the second electrode strip through the opening, the opposite surface of the resistor strip having at least a portion in electrical contact with the first electrode strip.

In preferred embodiments, the resistor strip is electrically insulated from the first electrode strip except for the portion in electrode contact with the first electrode strip, that portion being spaced along the resistor strip from the opening; the insulation is provided in the form of an insulating strip mounted between the first electrode strip and the resistor strip except at the portion of the resistor strip in electrical contact with the first electrode strip; the insulating strip and the resistor strip are rectangles of the same length, the insulating strip being wider, the resistor strip and insulator strip being mounted in staggered relation so that the portion of the resistor strip in electrical contact with the first electrode extends beyond one edge of the insulating strip and the opposite edge of the insulating strip extends beyond the opposite edge of the resistor strip; the opening in the dielectric strip is circular; the capacitor is a high voltage (800-3,500 volts, most preferably 1,100-3,000 volts) capacitor for use in a microwave oven; and the resistor strip is a carbon loaded strip of paper.

The discharge resistor of the invention electrically connects two electrodes of a rolled capacitor and thus effectively bleeds off any excess charge trapped in the capacitor after it has been disconnected. The resistor can be inserted easily into the capacitor without severing the electrodes or the dielectric strip separating them. Since neither electrode need be severed, the discharge resistor strip can be inserted into any portion of the capacitor winding. The discharge resistor strip can be used in single series as well as multi-series group capacitors.

The invention, when an insulating strip is employed, allows both resistivity and heat dissipation to be controlled easily by varying one or more easily varied parameters. The length of insulating strip insulating the resistor strip from the first electrode strip between the opening in the dielectric strip and the portion of the first electrode strip where the resistor contacts it determines resistivity. In other words, the amount by which the resistor/first electrode contact point is spaced along the resistor strip from the opening can be varied as desired to provide more or less resistivity. This distance can also be varied to provide more or less heat dissipating capacity, which is of particular importance in high voltage applications.

Resistivity also can be varied easily simply by varying the size of the opening in the dielectric strip; a smaller opening provides greater resistivity. Resistivity also can be varied by varying the resistance characteristics of the resistor strip, e.g. by varying the amount of conductive material in the strip.

Other features and advantages of the invention will be apparent from the following description of the preferred embodiment, and from the claims.

DESCRIPTION OF THE PREFERRED EMBODIMENT

We first briefly describe the drawing.

DRAWING

The FIGURE is a diagrammatic representation of a wound capacitor, partially unwound, containing an internal discharge resistor strip according to the invention.

STRUCTURE

There is shown in the FIGURE rolled, 2,000-volt microwave oven capacitor 10 having dead soft electrical grade aluminum foil electrode strips 12 and 14, separated by polypropylene/paper/polypropylene dielectric strip 16. A second polypropylene/paper/polypropylene dielectric strip 11 overlies electrode strip 12. The dielectric strips are approximately $3\frac{1}{4}$ inches wide and the electrode strips approximately $2\frac{7}{8}$ inches wide. Electrodes 12 and 14 are approximately 0.22 mils thick.

Mounted on electrode strip 12 are carbon loaded paper discharge resistor strip 18 and paper insulating strip 24. Insulating strip 24 is approximately 2 inches wide and $7\frac{1}{2}$ inches long and discharge resistor strip 18 is approximately $\frac{3}{4}$ inches wide and $7\frac{1}{2}$ inches long. Insulating strip 24 electrically insulates resistor strip 18 from electrode strip 12 along the length of strip 18 except for the portion of strip 18 which extends, due to the staggered relation of strips 18 and 24, beyond one edge of strip 24 to contact electrode 12. The opposite edge of insulating strip 24 extends beyond the corresponding edge of resistor strip 18.

Dielectric strip 16 has circular through hole 30, through which a portion of resistor strip 18 makes electrical contact with electrode strip 14. Opening 30 has a diameter of approximately one inch. The relation between hole 30 and the position of resistor strip 18 is such that the active length of resistor 18, i.e. the portion including the portion in electrical contact with electrode strip 14 and the portion extending from that portion to the edge contacting electrode strip 12, is $5\frac{1}{4}$ inches. Resistor strip 18 has a resistivity of approximately 1.7 megohms per square inch.

Electrical lead tabs 32 and 34 are in electrical contact with electrodes 12 and 14 in capacitor roll 10 and extend from the roll. The capacitor is impregnated with a suitable dielectric liquid.

MANUFACTURE

Capacitor 10 is wound on a conventional automatic capacitor winding machine. When the region of electrode 12 in which resistor 18 and insulating strip 24 are to be inserted are about to be wound into the roll, the winding machine is stopped, the electrode and dielectric strips are immobilized using a clamp and a spinning rotary blade is used to cut circular hole 30 in dielectric strip 16. The cutout portion is then removed by suction. The cutting of hole 30 takes approximately one second. The clamp then releases the strips and the automatic winding operation resumes.

OPERATION

The diameter of opening 30 and the length of the active portion of resistor 18 are such that a high-resistance current path is provided between electrode strips 12 and 14 so that, when power to capacitor 10 is discontinued, discharge resistor strip 18 bleeds off excess charge between electrode strips 12 and 14, reducing stored charge to 50 volts within about 60 seconds. At the same time insulating strip 24 advantageously serves to dissipate excess heat.

OTHER EMBODIMENTS

Other embodiments are within the following claims. For example, the discharge resistor strip need not be insulated when the capacitor is designed for a low voltage, e.g. 10 to 20 volt applications, in which heat dissipation is not important. When no insulation is used, resistivity can be increased by making the hole in the dielectric strip smaller and increasing the resistivity of the material used to make the resistor strip.

The resistor strip can be of any suitable material, e.g. dielectric materials such as paper or polymeric materials which have been coated or impregnated with conductive materials. The opening in the dielectric strip separating the two electrode strips can be of any convenient shape.

The invention can be used in conjunction with a wide variety of capacitors, ranging from small ballast capacitors to high voltage capacitors containing electrode strips 20 inches wide or wider.

I claim:

1. A capacitor comprising, in combination,
    a first and a second electrode strip separated by a dielectric strip, said electrode strips and said dielectric strip being wound in a roll, said dielectric strip having an opening therethrough between said electrode strips, and
    a discharge resistor strip mounted between said first electrode strip and said dielectric strip at said opening,
    one surface of said resistor strip having a portion in electrical contact with said second electrode strip through said opening,
    the opposite surface of said resistor strip having no more than a portion in electrical contact with said first electrode strip, said portion being spaced along said resistor strip from said opening, and
    insulating means extending between said first electrode strip and said resistor strip except at said portion of said resistor strip in electrical contact with said first electrode strip.

2. The capacitor of claim 1 wherein said insulating means is an insulating strip.

3. The capacitor of claim 2 wherein said resistor strip and said insulating strip are rectangular and are mounted in staggered relation, said portion of said resistor strip in electrical contact with said first electrode strip extending beyond one edge of said insulating strip, the opposite edge of said insulating strip extending beyond the opposite edge of said resistor strip.

4. The capacitor of claim 3 wherein said resistor strip and said insulating strip are approximately the same length and said insulating strip is wider than said resistor strip.

5. The capacitor of claim 1 wherein said opening is circular.

6. The capacitor of claim 1 wherein said capacitor has a voltage rating between about 800 and 3,500 volts, said capacitor being adapted to be used in a microwave oven.

7. The capacitor of claim 6 wherein said voltage rating is between about 1,100 and 3,000 volts.

8. The capacitor of claim 1 wherein said resistor strip is a carbon loaded strip of paper.

* * * * *